United States Patent
Bartelmuss

(10) Patent No.: US 9,302,853 B2
(45) Date of Patent: Apr. 5, 2016

(54) INSTALLATION WITH AT LEAST ONE CONTINUOUS CONVEYOR BELT FOR CONVEYING MATERIALS AND PRODUCTS

(71) Applicant: JUD AKTIENGESELLSCHAFT PAPIERMASCHINEN, Ruggell (LI)

(72) Inventor: Klaus Bartelmuss, Teufenbach (AT)

(73) Assignee: JUD Aktiengesellschaft Papiermaschinen, Ruggell (LI)

( * ) Notice: Subject to any disclaimer, the term of this patent is extended or adjusted under 35 U.S.C. 154(b) by 0 days.

(21) Appl. No.: 14/614,441

(22) Filed: Feb. 5, 2015

(65) Prior Publication Data

US 2015/0232278 A1    Aug. 20, 2015

(30) Foreign Application Priority Data

Feb. 17, 2014    (AT) .................................. A 111/2014

(51) Int. Cl.
| | |
|---|---|
| *B65G 43/00* | (2006.01) |
| *B65G 15/64* | (2006.01) |
| *B65G 23/44* | (2006.01) |
| *B65G 15/28* | (2006.01) |
| *B65G 15/14* | (2006.01) |
| *D21F 7/08* | (2006.01) |
| *D21F 7/00* | (2006.01) |

(52) U.S. Cl.
CPC ................ *B65G 15/64* (2013.01); *B65G 15/14* (2013.01); *B65G 15/28* (2013.01); *B65G 23/44* (2013.01); *D21F 7/005* (2013.01); *D21F 7/086* (2013.01)

(58) Field of Classification Search
CPC ............................... B65G 39/16; B65G 23/44
USPC ................. 198/810.03, 810.04, 807, 813
See application file for complete search history.

(56) References Cited

U.S. PATENT DOCUMENTS

| | | | | |
|---|---|---|---|---|
| 3,513,966 | A * | 5/1970 | Eckels ................... | B65G 39/16 198/810.03 |
| 5,899,321 | A * | 5/1999 | El-Ibiary ............... | B65G 39/16 198/807 |
| 6,786,325 | B2 * | 9/2004 | Powell .................. | B65G 39/16 198/806 |
| 2005/0150747 | A1 * | 7/2005 | Menendez ............. | B65G 39/16 198/810.03 |
| 2007/0144871 | A1 * | 6/2007 | Tao ..................... | G03G 15/0131 198/810.03 |
| 2012/0255836 | A1 * | 10/2012 | Blanchard .............. | B41F 13/02 198/810.03 |
| 2012/0288581 | A1 * | 11/2012 | Biggel .................. | B65G 39/16 198/810.03 |

* cited by examiner

*Primary Examiner* — James R Bidwell
(74) *Attorney, Agent, or Firm* — Laurence A. Greenberg; Werner H. Stemer; Ralph E. Locher

(57) ABSTRACT

A conveying installation has least one endless conveyor belt guided via a plurality of rollers along a leading belt run for conveying material or products and a returning belt run, particularly for manufacturing a paper web with a wire belt or felt belt. At least one of the rollers has an adjustable mounting for adjusting and correcting a direction of movement of the conveyor belt. A tensioning unit for detecting and controlling a tension of the conveyor belt has a pressure-measuring apparatus disposed at the adjustable mounting. A movement correction unit for detecting deviations of a direction of movement of the conveyor belt from a correct movement and for correcting the movement includes a sensor that is disposed to monitor a lateral periphery of the conveyor belt. A sensor output of the sensor is used for adjusting the adjustable mounting of the one of the rollers.

9 Claims, 2 Drawing Sheets

INSTALLATION WITH AT LEAST ONE CONTINUOUS CONVEYOR BELT FOR CONVEYING MATERIALS AND PRODUCTS

CROSS-REFERENCE TO RELATED APPLICATION

This application claims the priority, under 35 U.S.C. §119, of Austrian patent application AT A111/2014, filed Feb. 17, 2014; the prior application is herewith incorporated by reference in its entirety.

BACKGROUND OF THE INVENTION

Field of the Invention

The present invention relates to an installation for conveying materials, products, and the like, having at least one continuous conveyor belt which is guided via rollers, having a leading belt run for conveying the materials or products, respectively, and having a returning belt run, furthermore having a unit for detecting and controlling the tension of the conveyor belt, and having a unit for detecting deviations of the direction of movement of the conveyor belt from the correct direction of movement and for correcting the direction of movement of the conveyor belt, wherein the unit for detecting and controlling the tension of the conveyor belt displays a pressure-measuring apparatus which is situated at a mounting of a roller, and the unit for detecting deviations of the direction of movement of the at least one conveyor belt from the correct direction of movement and for correcting the deviations furthermore displays a sensor which is assigned to a lateral periphery of the conveyor belt, the output of the sensor, for the correction of the direction of movement of the at least one conveyor belt, serving for adjusting one of the mountings of one roller.

The present invention, in particular, relates to an installation for producing paper, having at least one wire belt or one felt belt, respectively, which is guided via rollers, in particular drying rollers, for producing a paper web, wherein the wire belt and the felt belt, respectively, represent a conveyor belt.

In the case of installations of this type for conveying materials, products, and the like, there is the requirement for orderly operation that the at least one conveyor belt exhibits a predetermined tension and that the conveyor belt is moved exactly in the conveying direction.

In the case of installations for producing paper the quality of the paper being produced is influenced by the tension of the wire belt or the felt belt, respectively. Furthermore, if the wire belt or the felt belt does not run in the correct direction of movement, the belt will move out of the directional path, on account of which the production process is disturbed.

In order to be able to control the tension of the conveyor belt it is known for one of the rollers via which the conveyor belt is guided to be configured with a pressure-measuring apparatus, in order to thereby detect the tension of the conveyor belt. The conveyor belt is moreover guided via a roller which is adjustable in the direction of movement of the conveyor belt, on account of which the tension of the conveyor belt can be controlled so as to be at the required value.

In order to be able to control the direction of movement of the conveyor belt it is known for a sensor to be assigned to one of the lateral peripheries of the conveyor belt, on account of which deviations from the required direction of movement of the conveyor belt can be identified. As has been narrated above, one of the two mountings of one of the rollers is configured with a pressure-measuring apparatus. Furthermore, the other mounting of this roller is adjustable in the direction of movement of the conveyor belt. On account of this adjustment of the mounting of one of the rollers in relation to the conveyor belt, which adjustment is controlled so as to emanate from the sensor, the direction of movement of the conveyor belt can be controlled so that the latter moves exactly in the required direction.

In the case of known installations for conveying materials, products, and the like, on the one hand, one of the mountings of one of the rollers is thus configured having a pressure-measuring apparatus which serves for detecting the tension of the conveyor belt, and, on the other hand, the other mounting of this roller is adjustable in relation to the conveyor belt, in order to thereby be able to control the direction of movement of the conveyor belt.

SUMMARY OF THE INVENTION

It is accordingly an object of the invention to provide an installation for conveying materials and products with a continuous conveyor belt, which overcomes the above-mentioned and other disadvantages of the heretofore-known devices and methods of this general type and which simplifies the constructive configuration of such a conveying installation.

With the foregoing and other objects in view there is provided, in accordance with the invention, a conveying installation, comprising:

at least one endless conveyor belt guided via a plurality of rollers, the conveyor belt having a leading belt run for conveying goods and a returning belt run;

at least one of the rollers having an adjustable mounting or bearing configured for adjusting and correcting a direction of movement of the at least one conveyor belt;

a tensioning unit for detecting and controlling a tension of the conveyor belt, the tensioning unit including a pressure-measuring apparatus disposed at the adjustable mounting of the one of the rollers;

a movement correction unit for detecting deviations of a direction of movement of the conveyor belt from a correct direction of movement and for correcting the direction of movement of the conveyor belt, the unit for detecting movement deviations including a sensor disposed to monitor a lateral periphery of the conveyor belt and having a sensor output configured for adjusting the adjustable mounting of the one of the rollers.

The installation is particularly configured as a papermaking installation for manufacturing a paper web, wherein the at least one conveyor belt is at least one wire belt or at least one felt belt.

In other words, the objects of the invention are achieved according to the invention in that the pressure-measuring apparatus for detecting the tension of the conveyor belt is situated at that mounting of one of the rollers that is adjustable for correcting the direction of movement of the at least one conveyor belt. The term mounting, as used herein, is substantially synonymous with the term bearing.

Since thus both the unit for detecting the tension of the conveyor belt and also the unit for controlling the direction of movement of the conveyor belt are assigned to the same mounting of a roller of the installation, the effect is simplification in the construction, the assembly, the maintenance and in the exchange of component parts. This advantageous effect is obtained in particular when an existing conveying installation is retrofitted, since then the assembly works required therefor have to be performed only on one side of one of the rollers.

Preferably, the mounting of that roller at which the pressure-measuring apparatus is disposed is situated on a carriage which is adjustable in the direction of movement of the conveyor belt, wherein the pressure-measuring apparatus is disposed between the mounting and the carriage.

According to one preferred embodiment, the unit for detecting and controlling the tension of the at least one conveyor belt displays a pressure-measuring apparatus, the output of which is guided to a control unit by way of which the tension of the conveyor belt is detected, wherein the output of the control unit serves for adjusting a further roller in the direction of movement of the conveyor belt. The unit for detecting and controlling the tension of the conveyor belt may furthermore display a roller which is wrapped to at least 10° by the conveyor belt and which is adjustable in the direction of movement of the conveyor belt. The carriage on which one of the mountings of the roller is situated is adjustable by means of a correcting unit which is actuatable in a hydraulic or pneumatic manner, respectively, and which is controlled by the unit for detecting deviations of the direction of movement from the correct direction of movement of the conveyor belt.

According to one further preferred embodiment, that mounting for a roller that is adjustable for correcting the direction of movement of the at least one conveyor belt, in particular adjustable in the direction of movement direction of said conveyor belt, is mechanically coupled for feedback to the sensor for identifying deviations of the direction of movement of the at least one conveyor belt from the correct direction of movement of the conveyor belt. Furthermore, that roller to which the units for detecting and controlling the tension of the conveyor belt and for detecting and correcting the direction of movement of the conveyor belt are assigned is preferably situated in the region of the returning run of the conveyor belt.

In particular, an installation according to the invention is configured having two continuous conveyor belts, the material to be conveyed being situated between them, wherein each of these two conveyor belts is guided via one roller in which one of the mountings is assigned a unit for detecting and controlling the tension of the conveyor belts, and this mounting furthermore is adjustable in the direction of movement of the assigned conveyor belt.

Other features which are considered as characteristic for the invention are set forth in the appended claims.

Although the invention is illustrated and described herein as embodied in Installation for conveying materials, products, and the like, having at least one continuous conveyor belt, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
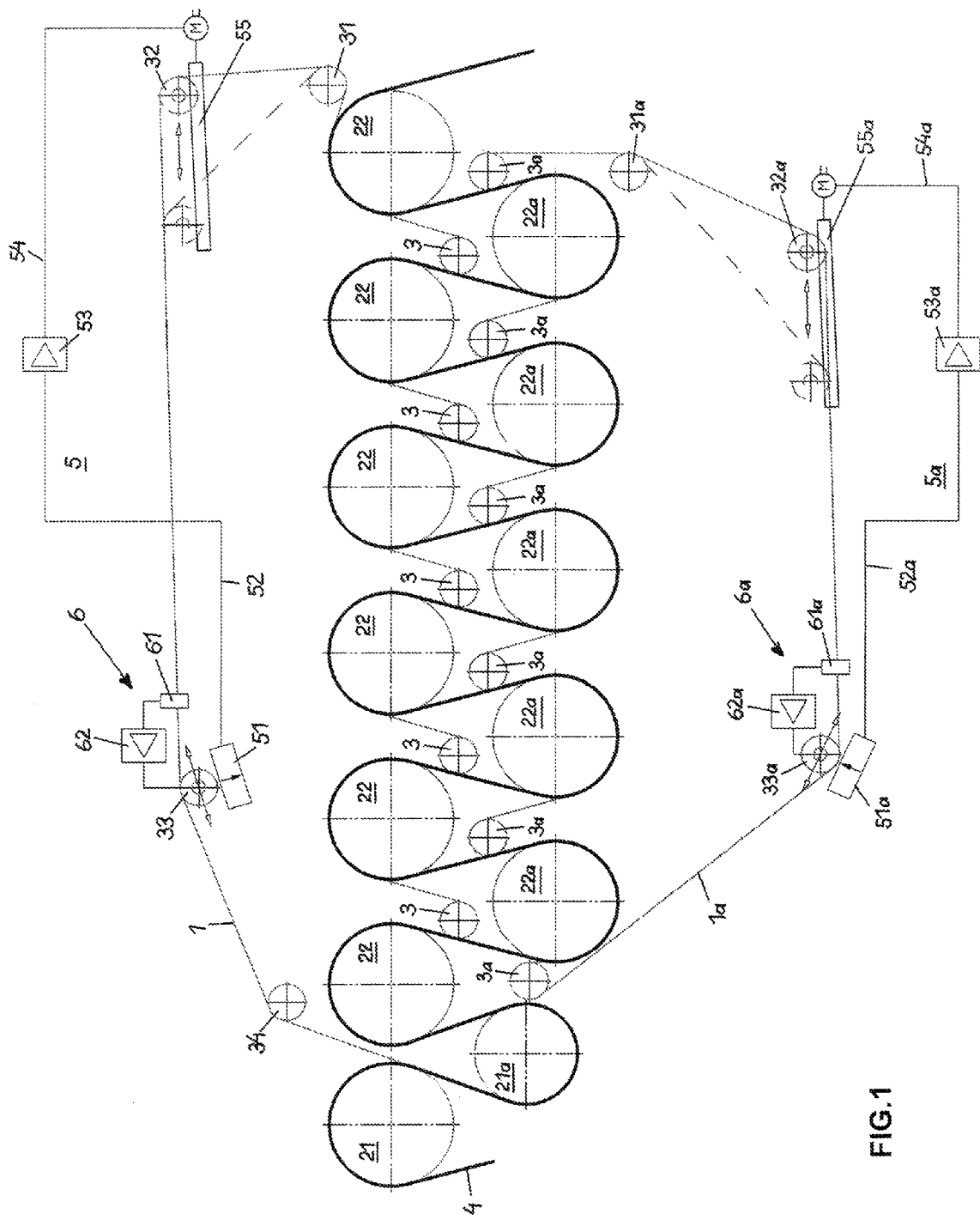
FIG. 1 shows a portion of an installation for producing a paper web, having two continuous felt belts which are movable so as to revolve, the paper web being situated between said felt belts, in a schematic illustration.

Referring now to the figures of the drawing in detail and first, particularly, to FIG. 1 thereof, there is shown a portion of an installation for producing paper with two groups of rollers 21, 22 and 21a, 22a, respectively, and deflecting rollers 3 and 3a, respectively, which are assigned to the former, and two continuous felt belts 1 and 1a, respectively, which are movable so as to revolve. The belts are guided via the rollers 21a, 22 and 22a, respectively, and the deflecting rollers 3 and 3a, respectively. A paper web 4 thereby moved through this portion is situated between the felt belts 1 and 1a, respectively, and the rollers 22 and 22a, respectively.

The rollers 22 and 22a, respectively, which are heated rollers, represent drying rollers for the paper web 4. At least some of the rollers 22 and 22a, respectively, are driven.

In the left region illustrated in the drawing, the paper web 4 is guided via the roller 21 of the first group of rollers. Consequently, the felt belt 1 bears on the paper web 4, which felt belt 1 at the same time is guided together with the paper web 4 via the roller 21a of the second group of rollers, the felt belt 1 being situated between the paper web 4 and the roller 21a. Thereafter, the felt belt 1 and the paper web 4 reach the first roller 22 of the first group of the rollers, the paper web 4 being situated between the felt belt 1 and this roller 22. Continuing therefrom, the felt belt 1 is guided via the first deflecting roller 3 of the deflecting rollers assigned to the first rollers to the following roller 22, whereas the paper web 4 moves via the first roller 22a of the second group of the rollers which are assigned to the second felt belt 1a. The second felt belt 1a is moved via the first deflecting roller 3a of the deflecting rollers 3a assigned to the second group of rollers and consequently comes to bear on the paper web 4 which is guided via the first roller 22a, the paper web 4 being situated between the second felt belt 1a and the first roller 22a. Thereafter, the second felt belt 1a is guided via a further deflecting roller 3a and a further roller 22a.

Continuing therefrom the first felt belt 1 is guided via the further deflecting rollers 3 and the further rollers 22, and the second felt belt 1a is guided via the further deflecting rollers 3a and via the further rollers 22a.

The paper web 4 is guided in an alternating manner via a roller 22 of the first group of the rollers and via a roller 22a of the second group of the rollers 22a, the paper web 4 in the regions of the rollers 22 and 22a, respectively, always being situated between one of the two felt belts 1 and 1a, respectively, and the rollers 22 and 22a, respectively.

At the end of this portion of this installation, the felt belts 1 and 1a, respectively, are guided back to the beginning of this portion via further rollers 31, 32, 33, 34 and 31a, 32a, 33a, respectively, by way of which the felt belts 1 and 1a, respectively, are deflected.

In the case of installations for producing a paper web there is, on the one hand, the requirement that the at least one felt belt displays a predetermined tension, since the quality of the produced paper depends on the tension of the felt belt or the felt belts, respectively. It must furthermore be ensured that the felt belt or the felt belts, respectively, moves or move in exactly the correct direction of movement, since a deviation of the felt belt or the felt belts, respectively, from the correct movement path causes functional disruptions in the operation of this installation.

In order to have the effect of controlling the tension of the at least one felt belt, a unit 5 for detecting and controlling the tension of the felt belt 1 is provided in the region of the returning run of the first felt belt 1. The unit 5 is also referred to as a tensioning unit. The roller 33 here is assigned a pressure-measuring apparatus 51 by way of which the pressure exerted on the roller 33 by the felt belt 1 is detected. The output signal of the pressure-measuring apparatus 51 is transmitted via a measuring line 52 to a control unit 53 by way of which the tension of the felt belt 1 is detected. The output of the control unit 53 is transmitted via a control line 54 to a correcting unit 55 for the roller 32, by way of which the roller 32 is displaceable in the direction of movement of the felt belt 1. The roller 32 is wrapped to 90° by the first felt belt 1. The wrapping is at least 10° and may also be 180°. On account of this wrapping, the tension of the felt belt 1 can be controlled to be a predetermined value by way of an adjustment of the roller 32.

Two end positions of the displaceable roller 32 are illustrated in FIG. 1.

Furthermore, a unit 6 for detecting deviations of the first felt belt 1 from the correct movement path and for correcting the direction of movement of the felt belt 6 is provided, which unit 6 includes a sensor 61, which is assigned to a periphery of the felt belt 1, and a control unit 62. The unit 6 is also referred to as a movement correction unit. Deviations in the direction of movement of the felt belt 1 from the correct direction of movement are detected by the sensor 61. Correction of the direction of movement of the felt belt 1 is performed by way of the control unit 62. To this end, the roller 33 is configured having a mounting which is displaceable in the direction of movement of the felt belt 1. By way of an adjustment of this mounting the angular position of the roller 33 in relation to the felt belt 1 is modified, on account of which the direction of movement of the felt belt 1 is controllable.

In an analogous manner, a unit 5a (also referred to as a tensioning unit) for detecting and controlling the tension of the felt belt 1a is assigned to the roller 33a, via which the returning run of the second felt belt 1a is guided. Here, one of the two mountings of the roller 33a is assigned a pressure-measuring apparatus 51a by way of which the pressure exerted on the roller 33a by the felt belt 1a is detected. The output signal of the pressure-measuring apparatus 51a is transmitted via a measuring line 52a to a control unit 53a, by way of which the tension of the felt belt 1a is detected. The output of the control unit 53a is guided via a control line 54a to a correcting unit 55a, by way of which the roller 32a which is wrapped by the felt belt 1a is displaceable in the direction of movement of the felt belt 1a, on account of which the tension of the felt belt 1a is controllable.

Furthermore, a unit 6a (also referred to as a movement correction unit) for detecting deviations of the second felt belt 1a from the correct movement path and for correcting the direction of movement of the felt belt 1a is provided, which unit 6a displays a sensor 61a, which is assigned to a periphery of the felt belt 1a, and a control unit 62a. Deviations of the direction of movement of the felt belt 1a from the correct direction of movement are detected by the sensor 61a. Correction of the direction of movement of the felt belt 1a is performed by the control unit 62a. To this end, the roller 33a is configured having a mounting which is displaceable in the direction of movement of the felt belt 1a. By way of an adjustment of this mounting the angular position of this roller 33a in relation to the felt belt 1a is modified, on account of which the direction of movement of the felt belt 1a is controllable.

The functioning of the units for detecting the tension of the two felt belts 1 and 1a, respectively, for controlling the tension of the felt belts 1 and 1a, respectively, for detecting deviations of the direction of movement of the felt belts 1 and 1a, respectively, from the correct direction of movement, and for correcting the directions of movement of the two felt belts 1 and 1a, respectively, are explained by means of FIG. 1.

To this end it is noted here that the felt belts 1 and 1a represent the conveyor belts for the paper web 4.

An embodiment according to the invention of these units will now be explained below with reference to FIG. 2.

Figure 2:
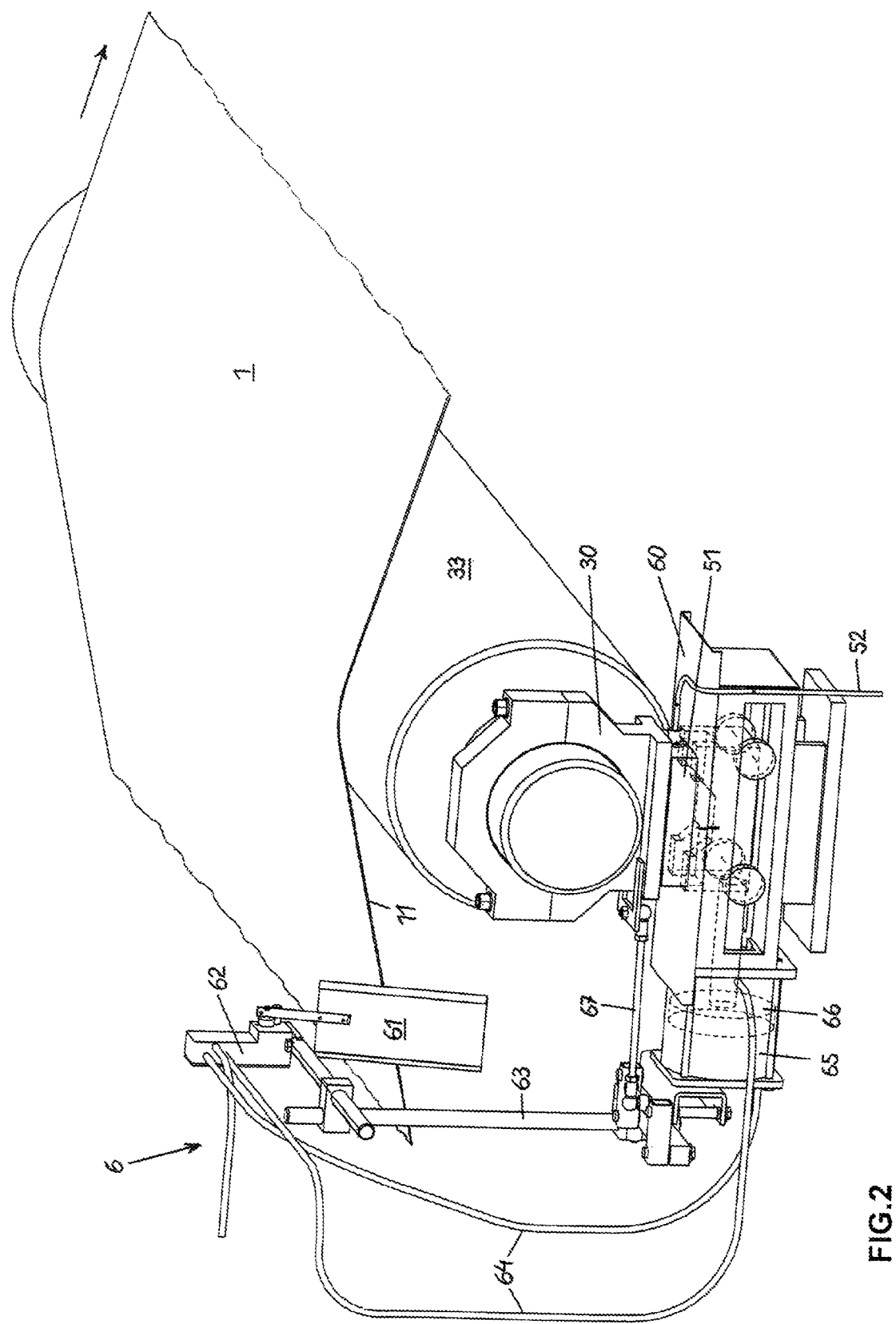
FIG. 2 shows a roller via which a felt belt is guided, wherein one mounting of this roller is assigned a unit for detecting the tension of the felt belt and a unit for controlling the direction of movement of the felt belt, in an axonometric illustration.

In FIG. 2 the roller 33 via which the felt belt 1 is guided and of which one of the mountings is configured having the pressure-measuring apparatus 51 is illustrated. The tension of the felt belt 1 is controllable by means of units 5 assigned to this roller 33. Furthermore, the mounting of this roller 33 is displaceable in the direction of movement of the felt belt 1, on account of which the direction of movement of the felt belt 1 is controllable.

The roller 33, on one of its two ends, is mounted on a bearing mounting 30 which is situated on a carriage 60 which is displaceable in the direction of movement of the felt belt 1. The pressure-measuring apparatus 51 which is preferably configured as a support-pressure measuring apparatus is situated between the bearing mounting 30 and the carriage 60. The output of the pressure-measuring apparatus 51 is guided via the control line 52 to the control unit 53. By way of the pressure-measuring apparatus 51 that pressure which is exerted on the roller 33 by the felt belt 1 is detected. The tension of the felt belt 1 is calculated therefrom by means of the control unit 53. By way of the output signal of the control unit 53, which is guided via the control line 54 to the correcting unit 55, the correcting unit 55 is controlled so that the roller 32 is adjusted in the direction of movement of the felt belt 1, on account of which the tension of the felt belt 1 is controlled.

The unit 6 for controlling and correcting the direction of movement of the felt belt 1 is configured having the sensor 61 which is pivotably mounted on a support frame 63. Since the sensor 61 bears on one of the two lateral peripheries 11 of the felt belt 1, said sensor 61 is pivoted by a deviation of the felt belt 1 from the correct direction of movement. On account of the sensor 61 being pivoted, a control valve 62 which is situated in a hydraulic or pneumatic control system is activated. Pressure lines 64 which lead to a correcting cylinder 65 having a correcting piston 66 are connected to the control valve 62. The carriage 60 on which the bearing mounting 30 is situated is adjustable by the correcting piston 66. By an adjustment of the carriage 60 the bearing mounting 30 is adjusted in the direction of movement of the felt belt 1, on account of which the angular position of the roller 33 in relation to the direction of movement of the felt belt 1 is modified. By way of this modification of the angular position of the roller 33 the direction of movement of the felt belt 1 is controlled.

Since the bearing mounting 30 is coupled to the support frame 63 by way of a linkage 67, a mechanical coupling for feedback of this control pertaining to the position of the sensor 61 is performed.

The adjustment of the carriage 60 by way of the output signal of the sensor 61 may also be electrically controlled.

Another correcting unit for the carriage 60 may also be provided in place of the correcting cylinder 65 having the correcting piston 66.

The units for detecting and for controlling the tension of the felt belt 1a and for detecting and controlling the direction of movement of the felt belt 1a which are assigned to the second felt belt 1a are configured in the same manner.

In the case of this constructive design it is relevant that the units for detecting the tension of the felt belts 1 and 1a, respectively, and for controlling the directions of movement of the felt belts 1 and 1a, respectively, are assigned to only one of the two mountings of a roller via which the felt belt 1 is guided, on account of which simplifications in erecting, converting, operating, and maintaining the installation can be achieved.

The present invention has been explained above by means of an installation for producing paper, in which the felt belts represent the conveyor belts for the paper web produced in the installation. However, the invention is also applicable to other installations which display at least one movable and continuous conveyor belt for transporting or for processing, respectively, materials or goods, respectively, since in the case of installations of this type controls for the tensions of the conveyor belts and for monitoring and correcting the directions of movement of the conveyor belts are required.

The following is a summary list of reference numerals and the corresponding structure used in the above description of the invention:
1, 1a Felt belts
11 Periphery of felt belt 1
21, 22, 21a, 22a Rollers
3, 3a Deflecting rollers
31, 32, 33, 34 Rollers
31a, 32a, 33a Rollers
30 Bearing mounting
4 Paper web
5, 5a Tensioning units, units for detecting and for controlling tension
51, 51a Pressure-measuring apparatuses
52, 52a Measuring lines
53, 53a Control units
54, 54a Control lines
55, 55a Correcting units
6, 6a Movement correction units, units for detecting and for controlling the direction of movement
60 Carriage
61, 61a Sensors
62, 62a Control units
63 Support frame
64 Control lines
65 Correcting cylinders
66 Correcting pistons
67 Linkage

The invention claimed is:

1. A conveying installation, comprising:
   at least one endless conveyor belt guided via a plurality of rollers, said conveyor belt having a leading belt run for conveying goods and a returning belt run;
   at least one of said rollers having an adjustable mounting configured for adjusting and correcting a direction of movement of said at least one conveyor belt;
   a tensioning unit for detecting and controlling a tension of said conveyor belt, said tensioning unit including a pressure-measuring apparatus disposed at said adjustable mounting of said one of said rollers;
   a movement correction unit for detecting deviations of a direction of movement of said conveyor belt from a correct direction of movement and for correcting the direction of movement of said conveyor belt, said unit for detecting movement deviations including a sensor disposed to monitor a lateral periphery of said conveyor belt and having a sensor output configured for adjusting said adjustable mounting of said one of said rollers;
   wherein said adjustable mounting of said roller at which said pressure-measuring apparatus is mounted on a carriage is adjustable in a direction of movement of said conveyor belt, and wherein said pressure-measuring apparatus is disposed between said mounting and said carriage.

2. The installation according to claim 1 configured as a papermaking installation for manufacturing a paper web, wherein said at least one conveyor belt is at least one wire belt or at least one felt belt.

3. The installation according to claim 1, which comprises a control unit receiving an output of said pressure-measuring apparatus of said tensioning unit and configured to determine the tension of said conveyor belt, said control unit having an output for adjusting a further roller in the direction of movement of said conveyor belt.

4. The installation according to claim 1, wherein said tensioning unit for detecting and controlling the tension of said conveyor belt includes a roller which is wrapped to at least 10° by said conveyor belt and which is adjustably mounted in the direction of movement of the conveyor belt.

5. The installation according to claim 1, which comprises an hydraulically or pneumatically adjustable correcting unit for moving and adjusting said carriage, said correcting unit being controlled by said unit for detecting deviations of the direction of movement from the correct direction of movement of the conveyor belt.

6. The installation according to claim 1, wherein said adjustable mounting for correcting the direction of movement of the at least one conveyor belt is mechanically coupled for feedback to said sensor for identifying deviations of the direction of movement of said at least one conveyor belt from the correct direction of movement of said conveyor belt.

7. The installation according to claim 1, wherein the respective said roller to which said tensioning unit and said movement correction unit are assigned is disposed in the returning run of said conveyor belt.

8. The installation according to claim 1, wherein said at least one conveyor belt is one of two continuous conveyor belts disposed to convey material therebetween, each of said two conveyor belts is guided via a roller having one of said mountings with a unit for detecting and controlling the tension of the respective said conveyor belt, and each of said mountings is adjustable in the direction of movement of the respectively associated conveyor belt.

9. A conveying installation, comprising:
   two endless conveyor belts disposed to convey material therebetween, said conveyor belts being guided via a plurality of rollers and each having a leading belt run for conveying goods and a returning belt run;
   at least one of said rollers having an adjustable mounting configured for adjusting and correcting a direction of movement of a respective said conveyor belt;
   a tensioning unit for detecting and controlling a tension of said conveyor belt, said tensioning unit including a pressure-measuring apparatus disposed at said adjustable mounting of said one of said rollers;
   a movement correction unit for detecting deviations of a direction of movement of said conveyor belt from a correct direction of movement and for correcting the direction of movement of said conveyor belt, said unit for detecting movement deviations including a sensor disposed to monitor a lateral periphery of said conveyor belt and having a sensor output configured for adjusting said adjustable mounting of said one of said rollers;

each of said two conveyor belts being guided via a roller having one of said mountings with a unit for detecting and controlling the tension of the respective said conveyor belt, and each of said mountings being adjustable in the direction of movement of the respectively associated conveyor belt.

\* \* \* \* \*